United States Patent [19]

Bogenschutz

[11] Patent Number: 4,501,346
[45] Date of Patent: Feb. 26, 1985

[54] DISC BRAKE ASSEMBLY

[75] Inventor: Thomas M. Bogenschutz, Clayton, N.Y.

[73] Assignee: General Signal Corporation, Stamford, Conn.

[21] Appl. No.: 354,994

[22] Filed: Mar. 5, 1982

[51] Int. Cl.³ ............................................. F16D 65/12
[52] U.S. Cl. .......................... 188/218 XL; 192/107 R
[58] Field of Search .... 188/218 XL, 264 A, 264 AA, 188/28 A, 73.2; 29/446, 452, 126, 130; 192/107 R; 193/37, 35 R

[56] References Cited

U.S. PATENT DOCUMENTS

| | | | |
|---|---|---|---|
| 2,412,432 | 12/1946 | Tack | 188/218 XL |
| 2,603,316 | 7/1952 | Pierce | 188/218 XL |
| 2,621,762 | 12/1952 | Bachman | 188/218 XL |
| 2,682,936 | 7/1954 | Almen | 188/218 XL |
| 2,745,518 | 5/1956 | Bachman | 188/218 XL |
| 2,753,959 | 7/1956 | Johnson | 188/218 XL |
| 2,765,881 | 10/1956 | Pierce | 188/218 XL |
| 2,769,512 | 11/1956 | Tack | 188/218 XL |
| 3,101,272 | 8/1963 | Setzer | 29/446 |
| 3,335,482 | 8/1967 | McClatchie | 29/446 |
| 3,378,114 | 4/1968 | Hollins | 188/218 XL |
| 4,002,227 | 1/1977 | Simon | 188/218 XL |
| 4,077,501 | 3/1978 | Morris | 188/218 XL |
| 4,083,435 | 4/1978 | Gallus | 188/218 XL |

FOREIGN PATENT DOCUMENTS

| | | |
|---|---|---|
| 1200339 | 9/1965 | Fed. Rep. of Germany . |
| 2025625 | 4/1971 | Fed. Rep. of Germany . |
| 1510697 | 12/1967 | France ........... 188/218 XL |
| 1149126 | 4/1969 | United Kingdom . |
| 2090636 | 7/1982 | United Kingdom . |

Primary Examiner—Bruce H. Stoner, Jr.
Assistant Examiner—Alvin Oberley
Attorney, Agent, or Firm—Thomas R. FitzGerald; Harold S. Wynn

[57] ABSTRACT

A disc brake assembly has a plurality of pairs of cantilever arms that extend in opposite axial directions and support a brake ring on a hub. The arms expand and contract under thermal and inertial loads.

10 Claims, 4 Drawing Figures

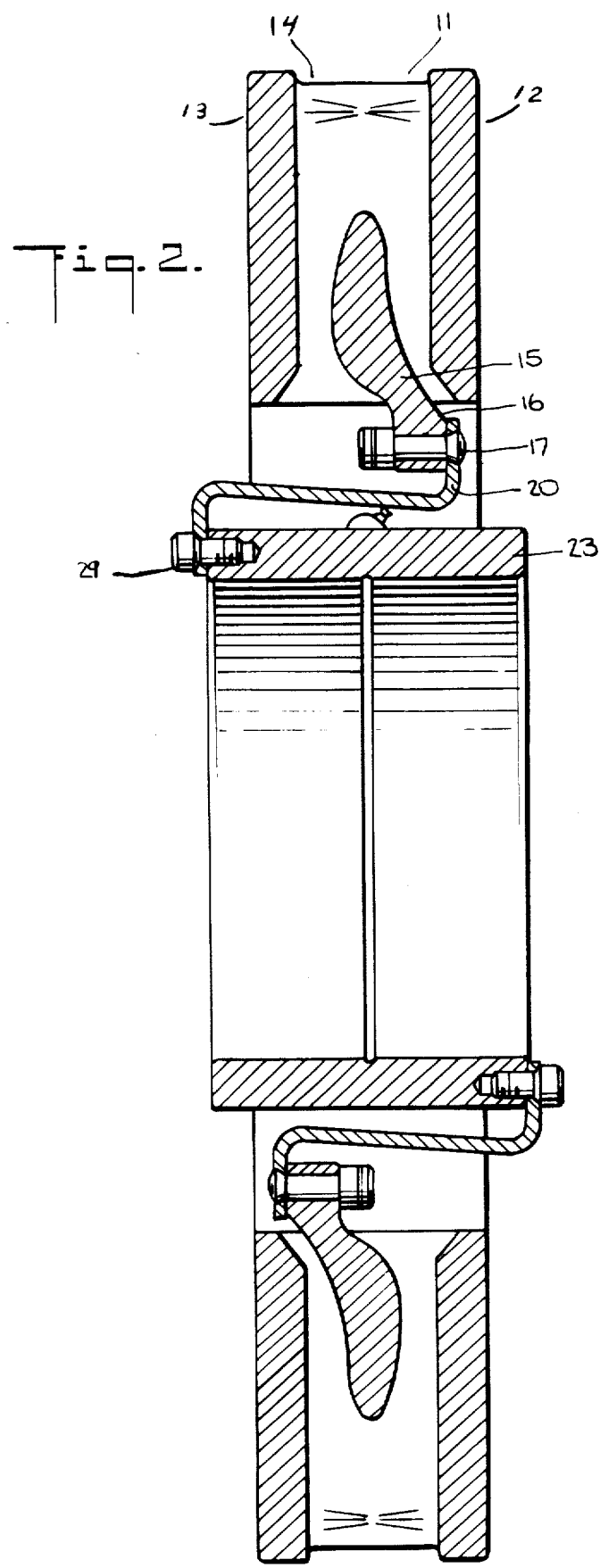

DISC BRAKE ASSEMBLY

FIELD OF THE INVENTION

This invention relates generally to disc brake assemblies for railway cars and, more particularly, to disc brake assemblies having improved transverse stability.

BACKGROUND

Disc brakes for railway cars generally include an outer braking ring having two spaced-apart braking surfaces that are connected together by a plurality of cooling vanes or webs. These outer braking ring members are generally made from some material which provides a good braking surface, such as cast iron. The outer braking member is connected to and supported by an inner member or hub. The hub is usually made of a different material, such as cast steel. Accordingly, any means used for connecting the inner or hub member to the outer braking ring must not only secure and support the two, but must also accommodate the expansion and contraction of the braking ring.

Early attempts to fashion disc brake assemblies generally called for an inner, bell-shaped hub having fingers radially extending in one direction from the hub toward the braking disc. Then the braking disc was coupled to the extending fingers by a bolt, or interference fit, or braising, or any one of the foregoing. See, for example, U.S. Pat. Nos. 2,412,432; 2,621,762; and 2,603,316. As the railway vehicles became larger, thereby generating higher thermal and inertial loads, the foregoing assemblies cracked under the large stresses placed on the assembly members, particularly at their connecting points.

Current disc brake assemblies are subjected to high torque and thermal load during normal braking. Torque produced by the friction of the brake pads is transmitted from the disc assembly to the wheels. A large thermal load, also due to the friction, thermally expands the disc in axial and radial directions. With these loads on the disc, a connecting member which supports the disc to the hub assembly must be able to allow for the thermal expansion of the disc while transmitting the braking torque to the hub.

In U.S. Pat. No. 4,083,435, one method for accommodating this expansion and contraction is to provide a highly precisely machined interference fit between the disc and the hub. In that patent, an extension of a vane of the outer braking ring fits snugly into a groove of the inner hub. Other methods for mounting an outer disc to an inner hub are shown in U.S. Pat. Nos. 4,108,826 and 4,077,501. The former provides a plurality of clamping sleeves seated in radially opposed bores in the hub and the outer ring. The latter provides a plurality of lugs that are integral with the cooling vanes and extend radially from the braking ring toward the hub. Specially formed slots in the lugs accommodate a bolt that fixes the lug portion to a portion of the hub. The specially formed slots are fashioned to provide for the necessary expansions between the hub and the braking ring.

Another current disc brake assembly has four rigid slotted arms on the hub which are used to bolt the disc to the hub. The arms are slotted to allow for the disc connection to slip radially along the arms caused by the thermal expansion of the disc. Vibration induced by track irregularities and thermal expansion and contraction of the disc causes slipping and fretting wear between the disc and hub connections which eventually produces wear in the connection. The wear can lead to impact loading of the connection members.

In view of the foregoing, it would be desirable to have a disc brake assembly which provides for the expanding and contracting discs and hubs, resists fretting and still withstands the high loads induced by braking.

SUMMARY

It is an object of this invention to provide a disc brake assembly for resiliently supporting a brake ring coupled to a hub.

Another object of this invention is elimination of the fretting wear of the connection member.

Still another object of this invention is to provide a disc brake assembly that is made from less costly materials, is easy to manufacture, and is readily assembled in the field.

In summary, the disc brake assembly of the invention includes an outer annular brake ring having one or more braking surfaces. The outer brake ring is resiliently supported by an inner hub member that is disposed within and is concentric with the outer brake ring. Between the outer brake ring and the inner hub are a plurality of pairs of cantilever arms. Each pair of cantilever arms extends radially between the hub and the brake ring and resiliently supports the ring as the ring and the hub undergo expansion and contraction during a braking operation. The arms of each pair of cantilever arms extend in opposite axial directions from the respective ends of the hub. These oppositely axially extending arms support the brake ring as the ring experiences thermal and inertial loads.

In the preferred embodiment, the cantilever arms are separate and distinct members that can be made from high-strength steel. These arms are fastened by suitable means at one end to the hub and at the other end to the brake ring. Since the supporting arms are not integral with the hub, the hub can be made of a less expensive metal alloy. Thus, unlike prior art devices, the entire hub does not have to be made from high-strength metal alloys. Also, in the preferred embodiment, the cantilever arms are prestressed radially inwardly towards the hub to thereby reduce the amount of stress which they undergo during a braking operation. Such stresses can be further reduced by lengthening the axial portion of the cantilever arms and by reducing the thickness of the cantilever members.

The effect of axial thermal expansion of the arm is reduced by locating the connection between the arm and the disc toward the center of the disc. At that location the temperature is less than the temperature at the brake rings due to the cooling provided by the fins that extend between the brake rings.

Internal stresses in the arms caused by axial expansion are further reduced by increasing the radii of curvatures of the bends in the arms and by matching the radial expansion of the brake rings to the arms. The latter requires the portion of the arm between its two ends be inclined at an angle with respect to its two end connecting points.

For a better understanding of the present invention, together with other and further objects thereof, one should refer to the following description, taken in connection with the accompanying drawing, the scope of the invention will be pointed out in the appended claims.

DESCRIPTION OF THE DRAWINGS

FIG. 2 is a partial cross-sectional view of the invention.

DETAILED DESCRIPTION

Figure 1:
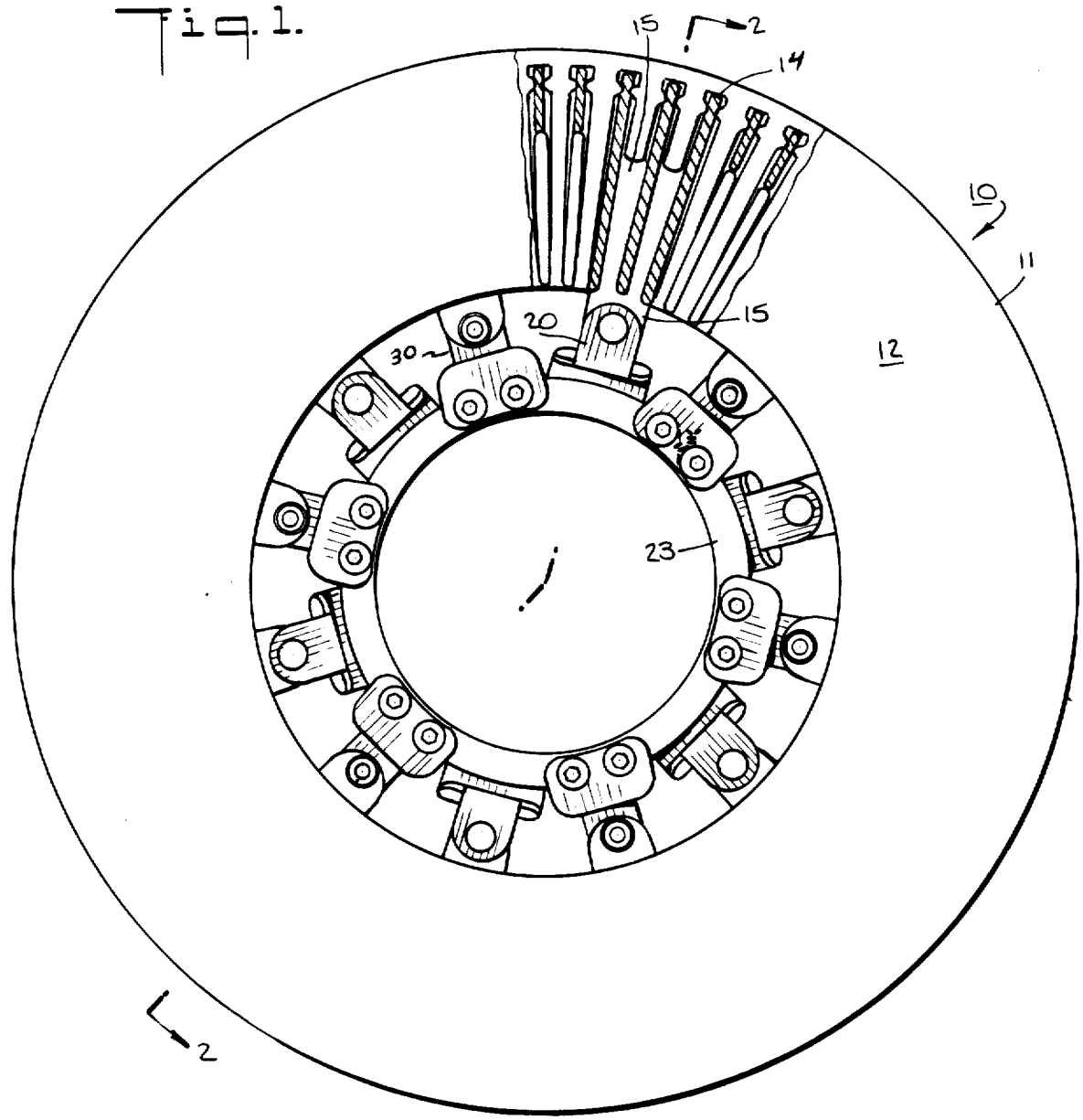
FIG. 1 is a partially broken-away side view of the invention.

Referring now to the drawings and more particularly to FIGS. 1 and 2 therein, the disc brake assembly 10 is shown comprising a brake ring 11, a hub 23, and a plurality of pairs of cantilever arms 20, 30 that are connected between the brake ring 11 and the hub 23. The brake ring 11 comprises two cast iron braking discs 12, 13 that are spaced apart from each other and connected to each other by a plurality of cooling vanes 14. The cooling vanes 14 are circumferentially spaced from each other and provide passages for air to be drawn in and across the inner surfaces of the braking disc 12, 13 to cool them. Three such vanes are integral with one another by means of a web 15 that has a lug portion 16 with an opening for receiving a fastener 17. Lug 16 is located between the two outer brake rings and in the path of the cooling air currents generated by vanes 14.

Figure 3:
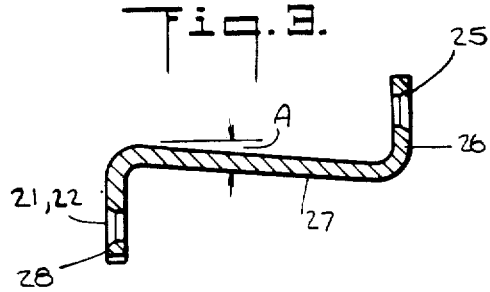
FIG. 3 is a sectional view of the supporting arm.
Figure 4:
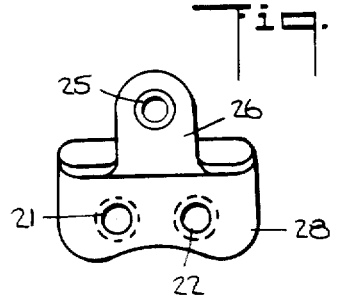
FIG. 4 is an end view of the supporting arm.

Turning to FIG. 2, there it can be seen that the brake ring 11 and the hub 23 are concentric and symetrically aligned one with the other. The hub 23 is connected to the brake ring 11 by a plurality of cantilever arms such as arm 20. With further reference to FIG. 3 and FIG. 4, each cantilever arm has an inner radial portion 26, an elongated axial beam portion 27, and an outer radial portion 28. The inner radial portion 26 is provided with one opening 25 for accommodating fastener 17 to fasten the inner radial portion 26 of the arm 20 to the lug 16 of disc 11. The outer radial portion 28 of arm 20 has two openings 21, 22 for accommodating other fasteners 29 to thereby fasten the outer radial portion 28 to the hub 23. The arms 20 are circumferentially spaced from each other between the hub 23 and the brake ring 11 in a serial manner. Each arm 20 extends in the opposite axial direction from each arm on either side of it. In this manner, the arms 20 present a criss-cross appearance and thereby provide the necessary lateral support to counterbalance transverse loads and thus stabilize the brake ring under braking conditions.

The assembly 10 has its hub 23 pressed onto the axle of a railway car. During braking operations, dynamic and thermal loads upon the brake ring 11, and in particular discs 12 and 13, cause the brake ring 11 to expand radially outwardly. The arms 20, made of high-strength metal alloy, are resilient and expand along with the brake ring. By virtue of their cantilever design, the arms 20 experience a minimum amount of stress. Since the arms 20 are staggered on either side of the hub 23, they provide the brake ring 11 with a transverse stability under inertial loading. Thus, when high heat and dynamic loads tend to cause the brake ring 11 to wobble, the cantilever arms 20 counterbalance such wobbling and tend to maintain the brake ring 11 in its original plane that is perpendicular to its axis.

In the preferred embodiment, there are twelve arms such as arm 20 arranged in six circumferential pairs. However, other numbers of pairs more or less could be adapted to provide a suitable assembly within the spirit and scope of this invention. In addition, the arms 20, 30 in the preferred embodiment are prestressed radially inwardly toward the hub 23 in order to further minimize the dynamic stresses in the arms 20. Those skilled in the art will appreciate that further stresses could be reduced by lengthening the arm 20 and by reducing its thickness.

A prestressed member is a member to which a force has been applied in order to withstand a working load more effectively, and, thereby reduce stress. As such, a prestressed member is loaded in a direction opposite to the stresses that are anticipated to be applied to the member. In the case of the present invention, the arms 27 are prestressed radially inwardly, and thereby assume their cant angle. Such stressing allows the arms 27 to move axially and radially outwardly without undergoing undue stress.

As shown in FIG. 3, the axial beam portion 27 has a principal longitudinal axis substantially parallel to the hub axis and is axially stressed due to thermal expansion. Such expansion is reduced by locating one connecting lug 16 in the path of the cooling air currents. To further reduce stress, the arm 20 is fashioned as "S" shaped members to elongate the connection between the arm 20 and brake ring 11 an amount equal to the anticipated axial and radial displacements of the arm portion 27.

For example, an arm 20 has an axial beam portion 27 of 4.5 inches in length and ⅜ inches thick. The radial displacement is 0.04 inches when the brake ring thermally expands and the axial displacement is 0.003 inches relative to its principal axis. For a cant angle, A, of 7° relative to the principal axis, the axial beam portion 27 moves out 0.003 inches and the outer radial portion 28 expands 0.04 inches. Thus, the build up of stresses in an arm will be minimized by suitably canting the axial beam portion.

The disc brake assembly 10 fulfills the objects of this invention by providing a design that will resiliently support a brake ring and also provide transverse stability. Moreover, the assembly 10 is an economical design inasmuch as the most costly metals need only be used for a relatively small number of supporting arms 20. Furthermore, the assembly 10 is easily manufactured since complicated castings of hub members 23 are virtually eliminated. Nevertheless, those skilled in the art will recognize that the arms 20, 30 could be cast integral with the hub, if so desired.

While there has been described what is at present considered to be the preferred embodiment of the invention, it will be obvious to those skilled in the art that various changes and modifications may be made in the invention without departing from the spirit and scope of the invention as defined in the appended claims.

What I claim is:

1. A disc brake assembly comprising in combination:
   (a) a brake ring;
   (b) hub disposed within and concentric with said brake ring;
   (c) pairs of resilient cantilever arms, the arms of each pair extending axially and radially from their connections to opposite ends of the hub respectively to the brake ring, each arm resiliently supporting the brake ring for thermally elongating and contracting in radial and axial amounts matched to the thermal elongations and contractions of the brake ring so that stresses in the arms are minimized and the brake ring is transversely stabilized during thermal and inertial loads;
   (d) the arms being prestressed to have their principal longitudinal axis substantially parallel to the axis of the hub, but canted slightly inwardly relative to their connection to the hub under no load conditions; and, (e) the arms being operable under braking load conditions to have their principal axis parallel to the axis of the hub or canted slightly outwardly relative to their connection to the hub as the braking load and temperature rises.

2. The invention of claim 1 wherein each cantilever arm is fastened at one end to the hub and at the other end to the brake ring.

3. The invention of claim 1 wherein the hub is integral with the cantilever arms and each arm is fastened at its end to the brake ring.

4. The invention of claim 1 wherein the cantilever arms are made from a high strength metal alloy and the hub is made from a different material.

5. The invention of claim 1 wherein the cantilever arms are prestressed a predetermined distance radially toward the hub.

6. The invention of claim 1 wherein the brake ring is provided with a plurality of radial lugs extending towards the hub and adapted for receiving a fastener.

7. The invention of claim 1 wherein the cantilever arms have axial beam portions that are canted at a predetermined angle to reduce stresses that build up during a braking operation.

8. The invention of claim 1 wherein the brake ring includes two discs axially spaced from each other cooling vanes connecting and extending between the discs, and means disposed among the cooling vanes for connecting to one end of the cantilever arm, thereby placing the cantilever arm connection in the path of air that passes through the cooling vanes.

9. The invention of claim 1 wherein each cantilever arm includes inner and outer radial portions, staggered and spaced with respect to each other, and an axial beam portion, having a principal longitudinal axis substantially parallel to the axis of the hub, extending from the radially outer end of the inner radial portion to the radially inner end of the outer radial portion.

10. The invention of claim 1 wherein the hub extends beyond both ends of the brake rings.

* * * * *